(12) United States Patent
Benoist

(10) Patent No.: US 11,588,509 B2
(45) Date of Patent: Feb. 21, 2023

(54) CARRIER SUPRESSION IN A NFC RECEIVER

(71) Applicant: NXP B.V., Eindhoven (NL)

(72) Inventor: Frederic Benoist, Saint Paul de Vence (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/446,496

(22) Filed: Aug. 31, 2021

(65) Prior Publication Data

US 2022/0103195 A1  Mar. 31, 2022

(30) Foreign Application Priority Data

Sep. 30, 2020  (EP) ..................... 20306132

(51) Int. Cl.
*H04B 1/16* (2006.01)
*H04B 5/00* (2006.01)
*H04B 1/08* (2006.01)

(52) U.S. Cl.
CPC ............. *H04B 1/08* (2013.01); *H04B 5/0031* (2013.01); *H04B 5/0075* (2013.01)

(58) Field of Classification Search
CPC ...... H04B 1/08; H04B 5/0031; H04B 5/0075; H04B 5/00; H04B 5/0025; H04B 1/16
See application file for complete search history.

(56) References Cited

U.S. PATENT DOCUMENTS

| | | | |
|---|---|---|---|
| 8,606,212 B2 | 12/2013 | Sheikholeslami | |
| 9,960,735 B1 | 5/2018 | Ding et al. | |
| 10,148,475 B1 | 12/2018 | Jongsma | |
| 10,361,735 B2 | 7/2019 | Myoung et al. | |
| 2003/0231054 A1* | 12/2003 | Magoon | H03F 3/45977 330/9 |
| 2007/0204700 A1* | 9/2007 | Inokuchi | G01L 1/2256 73/794 |
| 2008/0130800 A1* | 6/2008 | Maxim | H03C 3/40 375/345 |
| 2008/0169951 A1* | 7/2008 | Krivokapic | H03G 3/3036 341/139 |

(Continued)

FOREIGN PATENT DOCUMENTS

| | | |
|---|---|---|
| EP | 3503405 A2 | 6/2019 |
| GB | 2491883 A | 12/2012 |

*Primary Examiner* — Andrew Wendell
(74) *Attorney, Agent, or Firm* — Daniel D. Hill

(57) ABSTRACT

A near-field communication (NFC) receiver includes first and second input terminals for receiving first and second input signals having a modulated signal portion and a carrier signal portion. The receiver includes a digital-to-analog converter (DAC), a mixer, a track-and-hold (T&H) circuit, an amplifier, and an analog-to-digital converter. The mixer has a first input coupled to receive the first and second input signals and a second input coupled to receive a low frequency current from the DAC. The mixer subtracts the carrier portion from the first and second input signals using the DAC current at a level determined using a DSP in a feedback loop to approximate the carrier. The T&H circuit has an input coupled to receive the combined current and an output to provide a series of output samples. The ADC is coupled to receive the amplified output signal and to provide a digital representation of the amplified output signal.

19 Claims, 5 Drawing Sheets

(56) References Cited

U.S. PATENT DOCUMENTS

| | | |
|---|---|---|
| 2010/0075624 A1 | 3/2010 | Shanan |
| 2010/0289544 A1* | 11/2010 | Lee .................... H04L 7/0331 |
| | | 327/159 |
| 2013/0033392 A1* | 2/2013 | Nani .................... H03M 1/08 |
| | | 341/172 |
| 2017/0155398 A1* | 6/2017 | Narayanan .......... H03M 1/1295 |
| 2019/0020378 A1 | 1/2019 | Pieber et al. |
| 2019/0173479 A1* | 6/2019 | Dyachenko ......... H03M 1/0641 |
| 2019/0190554 A1* | 6/2019 | Srinivasan ........... H04B 5/0056 |

* cited by examiner

CARRIER SUPRESSION IN A NFC RECEIVER

CROSS-REFERENCE TO RELATED APPLICATIONS

This application claims priority under 35 U.S.C. § 119 to European Patent Application No. 20306132.0, filed on Sep. 30, 2020, the contents of which are incorporated by reference herein.

BACKGROUND

Field

This disclosure relates generally to electronic circuits and more specifically to a near-field communication (NFC) receiver.

Related Art

A NFC device can operate as a reader or a card. When operating as a card, a signal received by the NFC device is AM/phase modulated with a minimum modulated-to-carrier ratio in the order of 10%, and a carrier frequency mat have a few kHz (kilo hertz) offset. The carrier is provided by a transmitter of a NFC device (operating in reader mode) through the antenna coupling system to generate power for the NFC device in card mode. The NFC device in card mode will AM/phase modulate this carrier signal through the antenna coupling system. However, the NFC device operating in reader mode receives/senses its own transmitted carrier. The signal received by the receiver on the NFC device operating in reader mode could have a carrier-to-modulated signal ratio as high as 80 dB. The carrier needs to be removed/cancelled so that the transmitted modulated signal from the NFC device operating in card mode can be processed by the NFC device operating in reader mode.

Some receivers use mixers to first down convert the input signal and then remove the carrier using AC (alternating current) blocking capacitors or DC (direct current) tracking loops. The receiver converts the carrier to DC and no clipping is allowed, requiring a high dynamic range. NFC mixers may have a gain of 1 or less and may directly sample the signal with capacitors in the picofarad range (because of KT/C noise requirements) causing glitches and requiring up and/or down noise conversion. Other receivers may process the carrier together with the modulated signal, requiring almost 90 dB SNR (signal-to-noise ratio) at 13.56 MHz. Other receivers may cancel the carrier before the mixing operation, using a 13.56 MHz sine wave generator with programmable amplitude and phase (I/Q up mixer) together with a tracking loop.

BRIEF DESCRIPTION OF DRAWINGS

The present invention is illustrated by way of example and is not limited by the accompanying figures, in which like references indicate similar elements. Elements in the figures are illustrated for simplicity and clarity and have not necessarily been drawn to scale.

DESCRIPTION OF EMBODIMENTS

Figure 1:
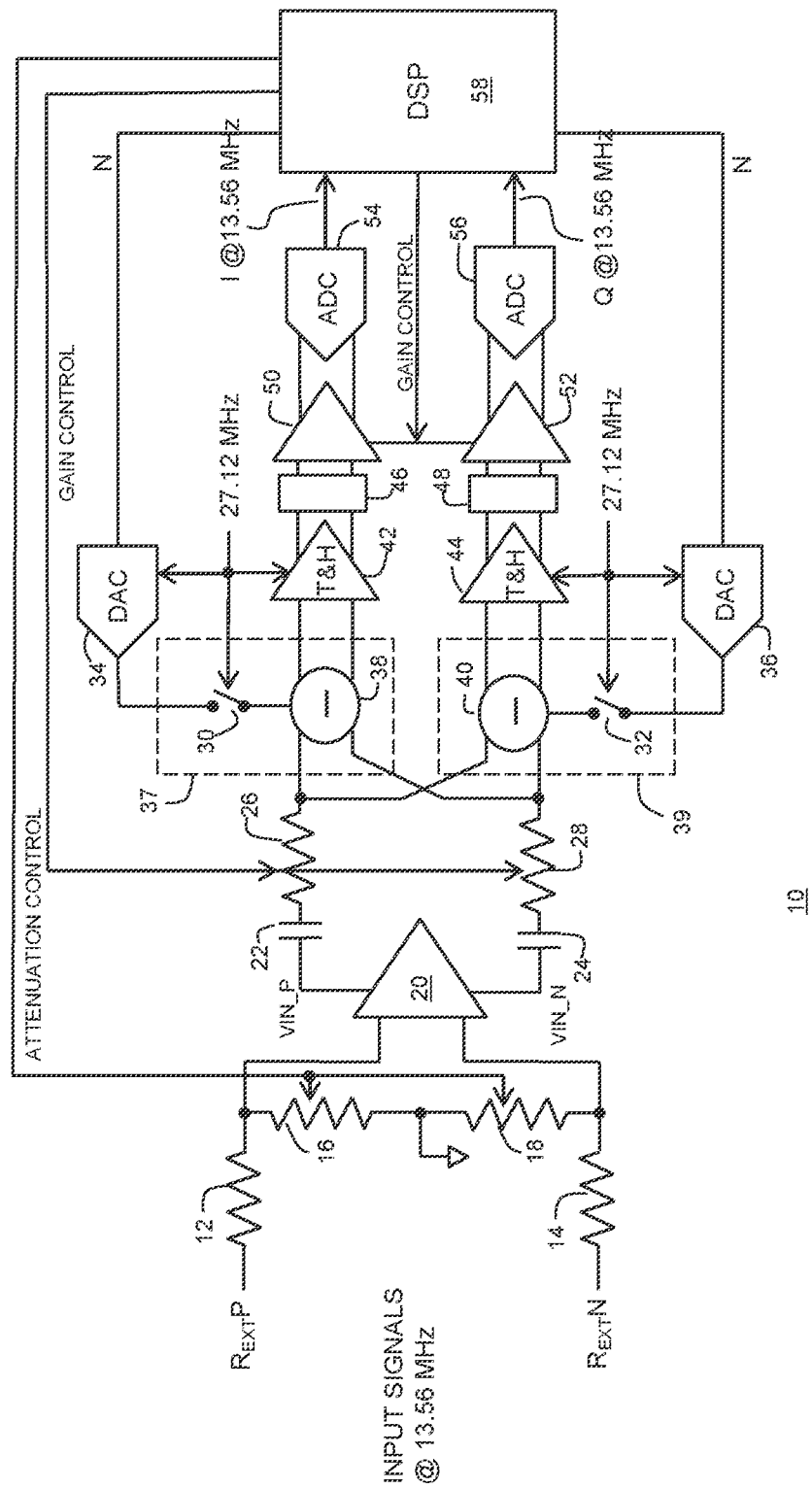
FIG. 1 illustrates a NFC receiver in accordance with an embodiment.

Generally, there is provided, a NFC receiver that suppresses a carrier while in reader mode using a current mode quadrature track and hold (T&H) mixer and a low frequency high resolution current steering digital-to-analog converter (DAC). The quadrature T&H mixer circuit has programmable gain and bandwidth, constant input impedance, and samples an input signal at twice the input frequency. An averaging circuit provides an average of two successive samples to return the output frequency of the receiver to be the same as the input frequency of 13.56 megahertz (MHz). The current steering DAC provides a DC or low frequency current that is subtracted from an input current to suppress the carrier in response to a control loop that controls a current level of the DAC to match a level of the carrier to be removed.

The carrier is suppressed in a direct conversion mixer with a bandpass response. In the described implementation, the DACs are controlled independently in order to suppress or partially suppress the average input current during a tracking phase of the T&H circuits. The carrier is suppressed prior to amplification in a mixer leading to lower input referred noise, allowing for more gain, and better sensitivity.

In one embodiment, there is provided, a receiver including: first and second input terminals for receiving first and second input signals; a digital-to-analog converter (DAC) for providing a current; a mixer having a first input coupled to receive the first and second input signals and a second input coupled to receive the current from the DAC, and in response, the mixer provides a combined current; a track-and-hold circuit having an input coupled to receive the combined current and an output to provide a series of output samples; an amplifier coupled to receive the output signal from the track-and-hold circuit and to provide an amplified output signal; and an analog-to-digital converter (ADC) coupled to receive the amplified output signal and to provide a digital representation of the amplified output signal. This embodiment represents a solution to the problem of how to increase the gain and sensitivity of an NFC receiver. The receiver may further include an averaging circuit coupled to the output of the track-and-hold, the averaging circuit may have an input coupled to receive the series of output samples from the track-and-hold circuit, and an output for providing an output signal that is an average of two consecutive output samples of the track-and-hold circuit, wherein the amplifier receives the output signal from the averaging circuit. The receiver may further include a variable input resistance coupled to the first and second input terminals. The receiver may further include a baseband circuit having an output for controlling an output level of the DAC in response to receiving the digital representation of the amplified output signal. The baseband circuit may provide gain control to the amplifier. The receiver may be a near-field communication (NFC) receiver. The receiver may further include a parallel-connected resistor and capacitor coupled between the input and the output of the track-and-hold circuit. The input of the track-and-hold circuit may include a positive input and a negative input, and wherein the mixer may further include: a first switch having a first terminal coupled to the first input terminal of the receiver and a second terminal coupled to the positive input; a second switch having a first terminal coupled to the first input terminal of the receiver and a second terminal coupled to the negative input; a third switch having a first terminal coupled to the second input terminal of the receiver and a second terminal coupled to the positive input; and a fourth switch having first terminal coupled to the second input terminal of the receiver and a second terminal coupled to the negative input. The receiver may further include a first capacitor and a first resistor coupled together in series and to the first input terminal, and a second capacitor and a second resistor coupled together in series and to the second input terminal.

In another embodiment, there is provided, a near-field communication (NFC) receiver including: first and second input terminals for receiving first and second input signals, respectively, wherein the first and second input signals include a modulated portion and a carrier portion; a first channel including: a first digital-to-analog converter (DAC) to provide a first current; a first mixer circuit having a first input coupled to receive the first and second input signals and a second input coupled to receive the first current, and in response, the first mixer circuit provides a first combined signal, wherein the carrier portion is at least partially suppressed in the combined signal; a first track-and-hold circuit having an input coupled to receive the first combined signal, and an output to provide a first series of track-and-hold output samples; a first amplifier coupled to receive the first track-and-hold output samples, and an output to provide a first amplified output signal; and a first analog-to-digital converter (ADC) coupled to receive the first amplified output signal, and an output to provide a digital representation of the first amplified output signal; and a second channel including: a second DAC to provide a second current; a second mixer circuit having a first input coupled to receive the first and second input signals, and a second input coupled to receive the second current, and in response, the second mixer circuit provides a second combined current, wherein the carrier portion is at least partially suppressed in the combined signal; a second track-and-hold circuit having an input coupled to receive the second combined current, and an output to provide a second track-and-hold output signal; a second amplifier coupled to receive the second track-and-hold output signal, and an output to provide a second amplified output signal; and a second analog-to-digital converter (ADC) coupled to receive the second amplified output signal, and an output coupled to provide a digital representation of the second amplified output signal. This embodiment represents an alternative solution to the problem of how to increase the gain and sensitivity of an NFC receiver. The first and second mixers may each provide a subtraction operation, and wherein the first current and the second current are provided at a current level to at least partially suppress the carrier portion. The input of each of the first and second track-and-hold circuits includes a positive input and a negative input, and wherein each of the first and second mixer circuits may further include: a first switch having a first terminal coupled to the first input terminal and a second terminal coupled to the positive input; a second switch having a first terminal coupled to the first input terminal and a second terminal coupled to the negative input; a third switch having a first terminal coupled to the second input terminal and a second terminal coupled to the positive input; and a fourth switch having first terminal coupled to the second input terminal and a second terminal coupled to the negative input. The first and second channels may be first and second quadrature channels. The NFC receiver may further include: a first averaging circuit coupled between the output of the first track-and-hold circuit and the first amplifier, the first averaging circuit having an input coupled to receive the first series of track-and-hold output samples, and an output for providing an output signal that is an average of two consecutive output samples of the first series of track-and-hold output samples; and a second averaging circuit coupled between the output of the second track-and-hold circuit and the second amplifier, the second averaging circuit having an input coupled to receive the second series of track-and-hold output samples, and an output for providing an output signal that is an average of two consecutive output samples of the second series of track-and-hold output samples. The NFC receiver may further include a switch coupled between the first and second input terminals, the switch being controlled to provide a relatively constant input impedance for the NFC receiver. A gain of the first and second amplifiers may be variable. In yet another embodiment, there is provided, a near-field communication (RFC) receiver including: first and second input terminals for receiving first and second input signals, respectively, wherein the first and second input signals includes a modulated portion and a carrier portion; a first quadrature channel including: a first digital-to-analog converter (DAC) to provide a first current; a first mixer circuit having a first input coupled to receive the first and second input signals and a second input coupled to receive the first current, and in response, the first mixer circuit provides a first combined current, wherein the carrier portion of the first and second input signals is at least partially suppressed in the combined current; a first track-and-hold circuit having an input coupled to receive the first combined signal, and an output to provide a first series of track-and-hold output samples; a first averaging circuit having an input coupled to the output of the first track-and-hold circuit to receive the first series of track-and-hold output samples, and an output for providing an output signal that is an average of two consecutive output samples of the first series of track-and-hold output samples; a first amplifier coupled to receive the output signal from the first averaging circuit, and an output to provide a first amplified output signal; and a first analog-to-digital converter (ADC) coupled to receive the first amplified output signal, and an output to provide a digital representation of the first amplified output signal; and a second quadrature channel including: a second DAC to provide a second current; a second mixer circuit having a first input coupled to receive the first and second input signals, and a second input coupled to receive the second current, and in response, the second mixer circuit provides a second combined current, wherein the carrier portion of the first and second input signals is at least partially suppressed in the second combined current; a second track-and-hold circuit having an input coupled to receive the second combined current, and an output to provide a second series of track-and-hold output samples; a second averaging circuit having an input coupled to the output of the second track-and-hold circuit to receive the second series of track-and-hold output samples, and an output to provide an output signal that is an average of two consecutive output samples of the second series of track-and-hold output samples; a second amplifier coupled to receive the output signal from the second averaging circuit, and an output to provide a second amplified output signal; and a second analog-to-digital converter (ADC) coupled to receive the second amplified output signal, and an output coupled to provide a digital representation of the second amplified output signal. This embodiment represents another alternative solution to the problem of how to increase the gain and sensitivity of an NFC receiver. The input of each of the first and second track-and-hold circuits includes a positive input and a negative input, and wherein each of the first and second mixer circuits may further include: a first switch having a first terminal coupled to the first input terminal and a second terminal coupled to the positive input; a second switch having a first terminal coupled to the first input terminal and a second terminal coupled to the negative input; a third switch having a first terminal coupled to the second input terminal and a second terminal coupled to the positive input; and a fourth switch having first terminal coupled to the second input terminal and a second terminal coupled to the negative input. The NFC receiver may further include a first capacitor and a first resistor coupled together in series and to the first input terminal, and a second capacitor and a second resistor coupled together in series and to the second input terminal. The first and second mixers may each provide a current subtraction operation.

FIG. 1 illustrates NFC receiver 10 in accordance with an embodiment. Receiver 10 may be implemented on one or more integrated circuits fabricated using conventional semiconductor manufacturing processes. NFC receiver 10 includes resistors 12, 14, 16, 18, 26, and 28, amplifier 20, capacitors 22 and 24, switches 30 and 32, DACs 34 and 36, mixers 37 and 39, T&H circuits 42 and 44, averaging circuits 46 and 48, amplifiers 50 and 52, ADCs 54 and 56, and digital signal processor 58. Mixer 37 includes mixer switch portion 38 and switch 30. Mixer 39 includes mixer switch portion 40 and switch 32. The circuit elements of NFC receiver 10 form two quadrature channels I and Q. The I channel main signal path includes DAC 34, mixer portion 38, T&H 42, averaging circuit 46, amplifier 50, and ADC 54. The Q channel main signal path includes DAC 36, mixer portion 40, T&H 44, averaging circuit 44, amplifier 52, and ADC 56.

Receiver 10 is configured to receive input signals labeled "INPUT SIGNALS" while operating in reader mode. The input signals include a modulated portion and a carrier portion. The carrier portion may have a very high carrier-to-modulated signal ratio, making it difficult to demodulate the modulated portion without first removing or suppressing the carrier. Resistances labeled $R_{EXT}P$ and $R_{EXT}N$ as "seen" by the input signals (INPUT SIGNALS) are provided by resistors 12 and 14. In one embodiment, resistors 12 and 14 are implemented externally to an integrated circuit implementation of receiver 10. Variable resistors 26 and 28 provide a tunable attenuator for NFC receiver 10. Amplifier 20 provides a voltage buffer, or interface, between mixer switch portions 38 and 40 and resistors 12, 14, 16, and 18. Resistors 12 and 14, and variable resistors 16 and 18 provide a variable attenuation in response to receiving control signal labeled "ATTENUATION CONTROL". Mixer portions 38 and 40 receive the output signals from amplifier 20 and provide I and Q outputs. Mixers 38 and 40 function to subtract a current produced by DACs 34 and 36 from a current of the output signals produced by amplifier 20. This serves to at least partially remove the carrier from input signals INPUT SIGNALS. Digital-to-analog converters 34 and 36 are N-bit DACs and provide a near DC level signal to mixer portions 38 and 40. Digital-to-analog converters 34 and 36 and T&H circuits 42 and 44 are clocked at twice the input frequency of 13.56 MHz as shown in FIG. 1 by switches 30 and 32. The two DACs 34 and 36 are continuously controlled by DSP 58, so that the DC level out of ADCs 54 and 56 is minimized. When receiver 10 is operating in card mode the DACs are off.

The T&H circuits 42 and 44 receive the I and Q outputs from mixer circuits 38 and 40 and provide voltage samples to averaging circuits 46 and 48. Averaging circuits 46 and 48 output an average of two consecutive samples. After averaging, the voltage samples are amplified by amplifiers 50 and 52 and converted to digital by ADC circuits 54 and 56. The output of ADC circuits 54 and 56 is provided at 13.56 MHz. A gain provided by amplifiers 50 and 52 is controlled with a gain control signal (GAIN CONTROL) provided by DSP 58. Digital Signal Processing block 58 monitors the I/Q ADCs output data and manages the operation of receiver 10 including the attenuation, gain, and the current provided by DACs 34 and 36.

Figure 2:
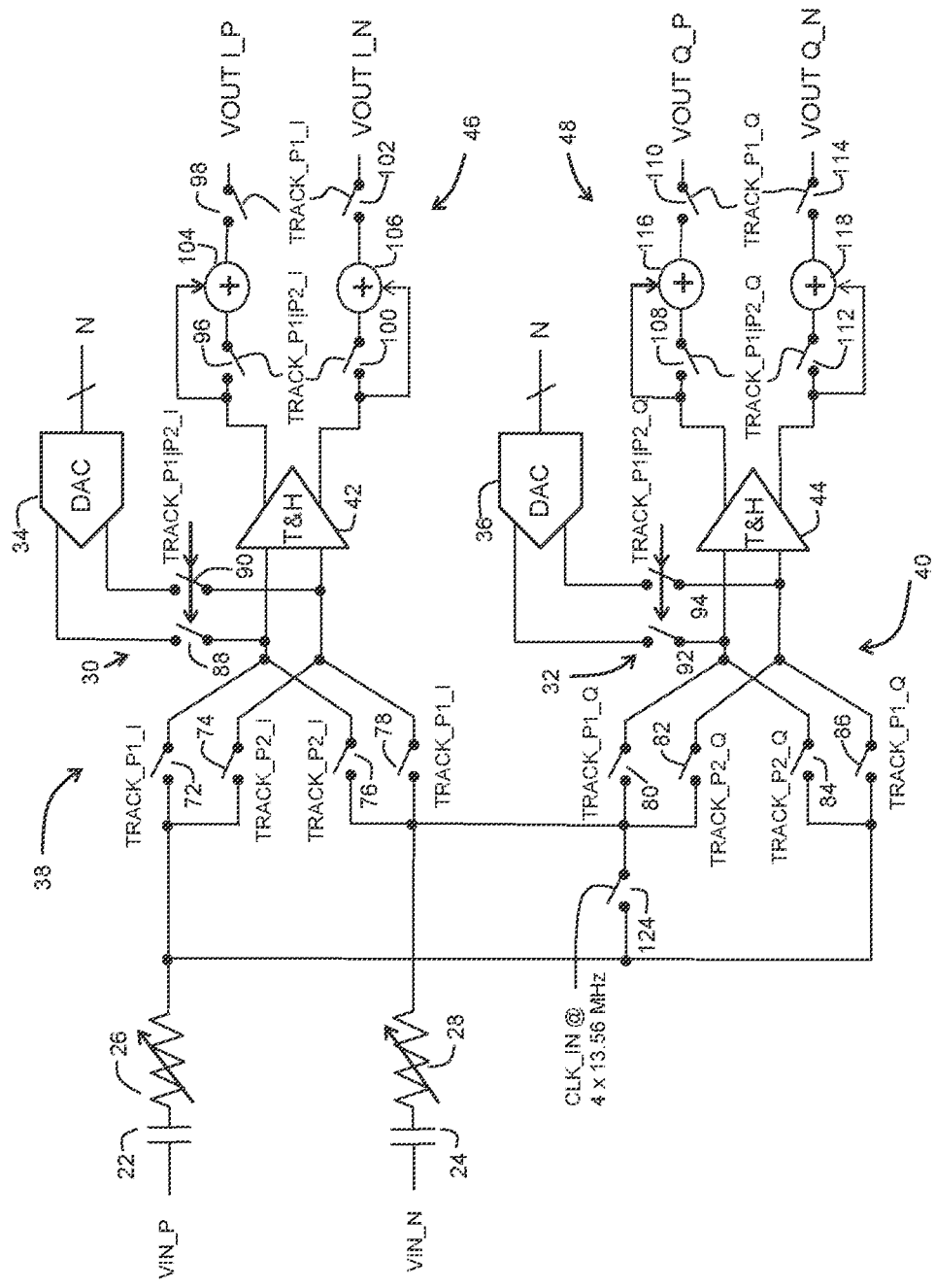
FIG. 2 illustrates a portion of the NFC receiver of FIG. 1 in more detail.

FIG. 2 illustrates a portion of NFC receiver 10 of FIG. 1 in more detail. Input signals VIN_P and VIN_N are provided to AC coupling capacitors 22 and 24 and variable resistors 26 and 28. AC coupling capacitors 22 and 24 function to remove low frequency noise. As shown in FIG. 2, mixer portion 38 includes switches 72, 74, 76, and 78 and mixer portion 40 includes switches 80, 82, 84, and 86. Switch function 30 is connected to the output of DAC 34 and includes switches 88 and 90. Switch function 32 is connected to the output of DAC 36 and includes switches 92 and 94. Averaging circuit 46 includes switches 96, 98, 100, and 102 and adders 104 and 106. Averaging circuit 48 includes switches 108, 110, 112, and 114, and adders 116 and 118. Control signals for controlling the switches are provided by DSP 58 or another control circuit (not shown). The conductors for conveying the control signals are not shown in FIG. 2 in the interest of simplicity and clarity. In mixer portion 38, switches 72 and 78 are controlled by control signal TRACK_P1_I, switches 74 and 76 are controlled by control signal TRACK_P2_I, and switches 88 and 90 are controlled by control signal TRACK_P1|P2_I. Control signal TRACK_P1|P2_I is a concatenation of control signals TRACK_P1_I and TRACK_P2_I. In mixer portion 40, switches 80 and 86 are controlled by control signal TRACK_P1_Q, switches 82 and 84 are controlled by control signal TRACK_P2_Q, and switches 92 and 94 are controlled by control signal TRACK_P1|P2_Q. Control signal TRACK_P1|P2_Q is a concatenation of control signals TRACK_P1_Q and TRACK_P2_Q. Mixers portions 38 and 40 split the input signals VIN_P and VIN_N into the I and Q channels. For example, in mixer circuit 38, switches 72 and 74 couple input signal VIN_P to both inputs of T&H circuit 42 and switches 76 and 78 couple input signal VIN_N to both inputs of T&H circuit 42. Likewise, in mixer circuit 40, switches 80 and 82 couple input signal VIN_N to both inputs of T&H circuit 44, and switches 84 and 86 couple input signal VIN_P to both inputs of T&H circuit 44. Mixers 38 and 40 connect input resistors 26 and 28 to either the I or Q channel T&H amplifier inputs.

In operation, the input voltage is first converted to a current. In each of the I and Q channel paths, the switches and control signals of mixers 38 and 40 cause a current from DAC 34 to be combined with a current from input signals VIN_P and VIN_N to remove, or subtract, the carrier from the input signals VIN_P and VIN_N. DACs 34 and 36 function as relatively low frequency current steering DACs having an N-bit resolution. The level of the current contributed by DACs 34 and 36 is determined by DSP 58 and the output signals VOUT I_P/VOUT I_N and VOUT Q_P/VOUT Q_N in a feedback loop. Track-and-hold circuits 42 and 44 receive the currents from mixers 38 and 40, respectively, and operate at 27.12 MHz, twice the input frequency. After the track and hold operation, every two successive samples from T&H circuits 42 and 44 are averaged so that the input and output frequencies of receiver 10 are the same, e.g., 13.56 MHz. Switch 124 is controlled by a clock signal CLK_IN and connected between input resistors 26 and 28 in order to maintain a constant input impedance to T&H circuits 42 and 44. Clock signal CLK_IN is provided at 4 times the input frequency of 13.56 MHz.

Figure 3:
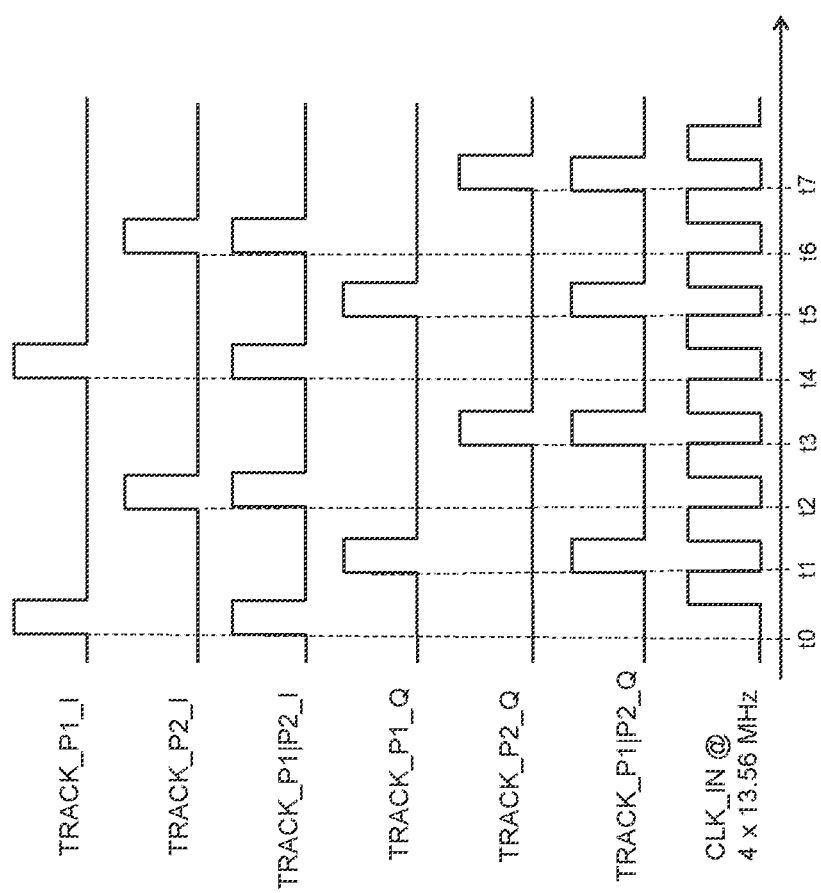
FIG. 3 illustrates various signals of the portion of the NFC receiver of FIG. 2.

FIG. 3 is a timing diagram of the control signals of the portion of NFC receiver 10 of FIG. 2. Each of the control signals is a relatively short duration pulse. When a control signal pulses high, the corresponding switch closes and is closed for the duration of the pulse. Note that in another embodiment, the control signals may be made to pulse low instead of high. When either the P1 or P2 switches are closed, the current from the DAC is subtracted from the input signals VIN_P and VIN_N. For example, time t0 marks a rising edge of control signals TRACK_P1_I and TRACK_P1|P2_I. Therefore, at time t0, switches 72, 78, 88 and 90 close connecting the VIN_P and VIN_N currents to the inputs of T&H 42 at the same time the current from DAC 34 is connected to the inputs of T&H 42. The currents are combined (subtracted in this case) so that the carrier portion of the input currents is at least partially removed by the current from DAC 34. Also, in averaging circuit 46, the current from two successive samples is averaged at time t0. At time t4, the same switch operation described above is repeated.

Likewise, for the Q channel, at time t1, control signals TRACK_P1_Q and TRACK_P1|P2_Q are asserted. Switches 80, 86, 92, and 94 close, connecting the VIN_P and VIN_N currents to the inputs of T&H 44 at the same time the current from DAC 36 is connected to the inputs of T&H 44. The currents are combined so that the carrier portion of the input currents is at least partially removed by the current from DAC 36. Also, in averaging circuit 48, the current from two successive samples is averaged at time t1. At time t5, the same switch operation described above is repeated.

Figure 5:
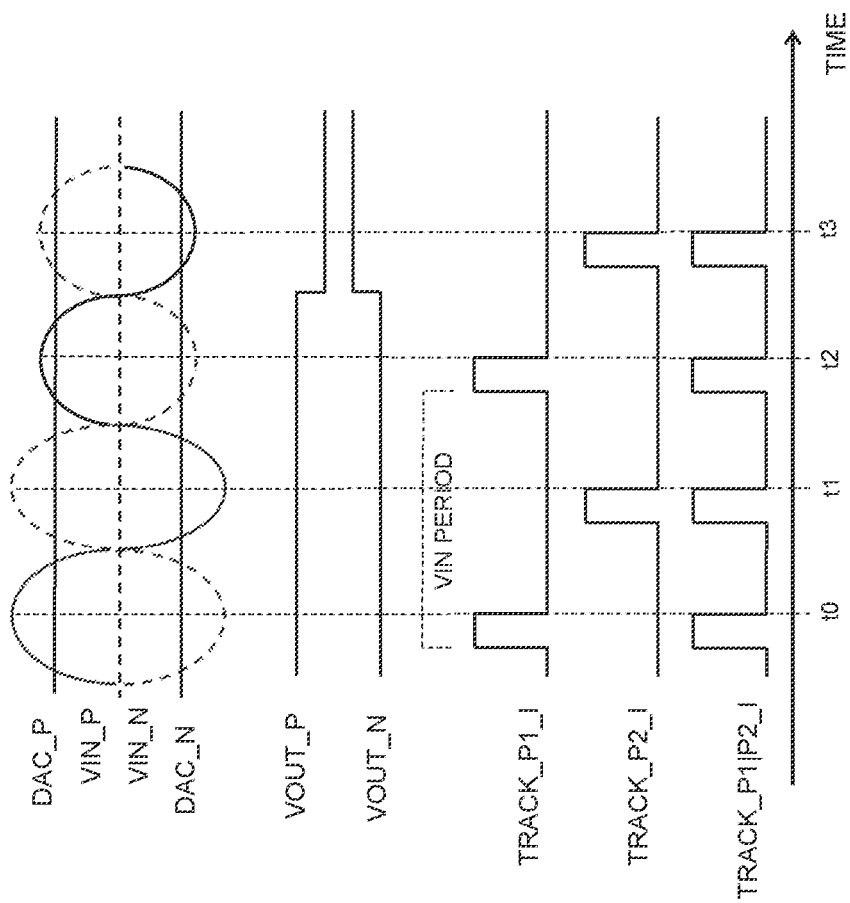
FIG. 5 illustrates various signals of the NFC receiver portion of FIG. 4.

At time t2, control signals TRACK_P2_I and TRACK_P1|P2_I are asserted high. Switches 74, 76, 88, and 90 are closed, again connecting the VIN_P and VIN_N currents to the inputs of T&H 44 at the same time the current from DAC 36 is connected to the inputs of T&H 44. The state of the control signals at time t2 is repeated at time t6. Control signals TRACK_P1_I and TRACK_P2_I are shifted 180 degrees from each other, and TRACK_P1_Q and TRACK_P2_Q are shifted 180 degrees from each other. Also, the control signals are aligned with the input signals VIN_P and VIN_N as illustrated in FIG. 5. This provides little or no low frequency error. The tracked current during TRACK_P1_I is almost identical to the current tracked during TRACK_P2_I and the rate is 27.12 MHz, or twice the input signal frequency.

Figure 4:
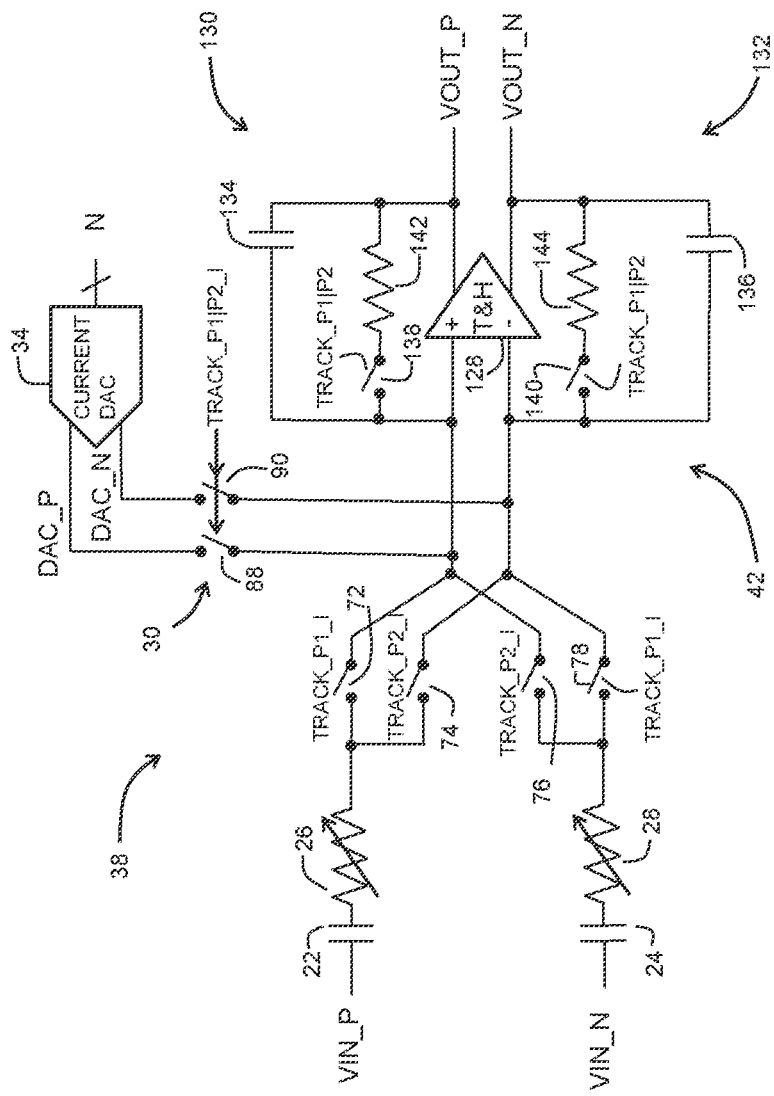
FIG. 4 illustrates one channel of the NFC receiver portion of FIG. 2 in more detail.

Clock signal CLK_IN is provided to control the operation of switch 124. The frequency of clock signal CLK_IN is four times higher than for input signals VIN_P and VIN_N and is asserted high during the times when none of the other switches are closed. This provides a relatively constant input impedance and avoids a high impedance state for the input signals. FIG. 4 illustrates the I channel path of the NFC receiver portion of FIG. 2 in more detail. The Q channel path is substantially identical to the I channel path and operates the same. More specifically, in FIG. 4, T&H circuit 42 includes T&H amplifier 128 and parallel RC (resistor capacitor) networks 130 and 132. Track and hold amplifier 128 has positive (+) and negative (−) inputs and outputs. The parallel RC networks 130 and 132 are each connected between an input and a corresponding output of a T&H amplifier 128. Parallel RC network 130 includes capacitor 134, switch 138 and resistor 142. Parallel RC network 132 includes capacitor 136, switch 140, and resistor 144. In parallel RC network 130, switch 138 and resistor 142 are connected in series. The series-connection of switch 138 and resistor 142 are connected in parallel with capacitor 134. The components of parallel RC network 132 are connected together the same as parallel RC network 130.

FIG. 5 illustrates various signals of the NFC receiver portion of FIG. 4. The two periods of input signals VIN_P and VIN_N are sinusoidal and 180 out of phase with each other. Also, the amplitude of the input signals during the second period is lower than the amplitude of the first period, where the higher amplitude represents a logic one and the lower amplitude represents a logic zero. The outputs DAC_P and DAC_N of current DAC 34 are also illustrated as a DC or very low frequency signal. Output signals VOUT_P and VOUT_N are digital signals having the same logic states as the input signals VIN_P and VIN_N. Note that signals VIN_P, VIN_N, DAC_P, and DAC_N are drawn relative to the horizontal dashed line, where the negative signal is below the dashed line and the positive signal is above the dashed line. Control signals TRACK_P1_I, TRACK_P2_I, and TRACK_P1|P2_I are the same as shown in FIG. 3 and described above. Note that times t0-t3 correspond to the peak amplitudes of signals VIN_P and VIN_N and align with the falling edges of control signals TRACK_P1_I, TRACK_P2_I, and TRACK_P1|P2_I. In a conventional sample and hold circuit, a capacitor is charged and then the input is sampled. In comparison, in T&H circuit 42, a current is provided in the parallel RC network when the switches are closed during a tracking phase. The current in the parallel RC network is not necessarily equal to the input current. Short pulses of the control signals are used to minimize changes in the input voltage during the tracking phase. Current steering DAC 34 is used to generate a DC or low frequency current. The level of the current is determined to reduce or eliminate the carrier from the input signal of NFC receiver 10. In mixer 38, the current from DAC 34 is subtracted from the input current when either the TRACK_P1_I or TRACK_P2_I switches are closed. The resulting current from mixer 38 feeds parallel RC networks 130 and 132 during the tracking phase of T&H circuit 42. The parallel RC networks 130 and 132 provide a low pass filter to remove high frequency noise and reduce input transients. At the end of the tracking phase, a voltage is held across capacitors 134 and 136 when switches 138 and 140 are opened. DAC 34, T&H circuit 42, and DSP 58 provide a mixed signal tracking loop so that the output signals VOUT_P and VOUT_N converge to the averaged input current over one tracking phase. This operation suppresses the carrier before amplification, thus allowing gain to be applied using resistors 26 and 28 and amplifiers 50 and 52 (FIG. 1). The resistance of resistor 142 divided by the resistance of resistor 26 is greater than one. The gain/cut off frequency may be adapted to the modulated signal bandwidth, allowing the overall mixer input referred noise to be significantly reduced. While high resolution is needed for current DAC 34 (to allow amplification of the modulated signal) DAC 34 can operate at a very low frequency and therefore is not too difficult to implement. In one embodiment, DAC 34 is a 12-bit DAC.

The ability to suppress the carrier as described using two T&H circuits running at twice the input frequency provides relatively constant input impedance, averaging of two successive samples, allows for programmable gain and bandwidth, and allows for larger swing VIN_P and VIN_N with a better signal-to-noise ratio (SNR).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A receiver comprising:
    first and second input terminals for receiving first and second input signals;
    a digital-to-analog converter (DAC) for providing a current;
    a mixer having a first input coupled to receive the first and second input signals and a second input coupled to receive the current from the DAC, and in response, the mixer provides a combined current;
    a track-and-hold circuit having an input coupled to receive the combined current and an output to provide a series of output samples;
    an amplifier coupled to receive the output signal from the track-and-hold circuit and to provide an amplified output signal;
    an analog-to-digital converter (ADC) coupled to receive the amplified output signal and to provide a digital representation of the amplified output signal; and
    a baseband circuit having an output for controlling an output level of the DAC in response to receiving the digital representation of the amplified output signal.

2. The receiver of claim 1, further comprising an averaging circuit coupled to the output of the track-and-hold, the averaging circuit having an input coupled to receive the series of output samples from the track-and-hold circuit, and an output for providing an output signal that is an average of two consecutive output samples of the track-and-hold circuit, wherein the amplifier receives the output signal from the averaging circuit.

3. The receiver of claim 1, further comprising a variable input resistance coupled to the first and second input terminals.

4. The receiver of claim 1, wherein the baseband circuit provides gain control to the amplifier.

5. The receiver of claim 1, wherein the receiver is a near-field communication (NFC) receiver.

6. The receiver of claim 1, further comprising a parallel-connected resistor and capacitor coupled between the input and the output of the track-and-hold circuit.

7. The receiver of claim 1, wherein the input of the track-and-hold circuit includes a positive input and a negative input, and wherein the mixer further comprises:
    a first switch having a first terminal coupled to the first input terminal of the receiver and a second terminal coupled to the positive input;
    a second switch having a first terminal coupled to the first input terminal of the receiver and a second terminal coupled to the negative input;
    a third switch having a first terminal coupled to the second input terminal of the receiver and a second terminal coupled to the positive input; and
    a fourth switch having first terminal coupled to the second input terminal of the receiver and a second terminal coupled to the negative input.

8. The receiver of claim 1, further comprising a first capacitor and a first resistor coupled together in series and to the first input terminal, and a second capacitor and a second resistor coupled together in series and to the second input terminal.

9. A near-field communication (RFC) receiver comprising:
    first and second input terminals for receiving first and second input signals, respectively, wherein the first and second input signals include a modulated portion and a carrier portion;
    a first channel comprising:
    a first digital-to-analog converter (DAC) to provide a first current;
    a first mixer circuit having a first input coupled to receive the first and second input signals and a second input coupled to receive the first current, and in response, the first mixer circuit provides a first combined signal, wherein the carrier portion is at least partially suppressed in the combined signal;
    a first track-and-hold circuit having an input coupled to receive the first combined signal, and an output to provide a first series of track-and-hold output samples;
    a first amplifier coupled to receive the first track-and-hold output samples, and an output to provide a first amplified output signal; and
    a first analog-to-digital converter (ADC) coupled to receive the first amplified output signal, and an output to provide a digital representation of the first amplified output signal; and
    a second channel comprising:
    a second DAC to provide a second current;
    a second mixer circuit having a first input coupled to receive the first and second input signals, and a second input coupled to receive the second current, and in response, the second mixer circuit provides a second combined current, wherein the carrier portion is at least partially suppressed in the combined signal;
    a second track-and-hold circuit having an input coupled to receive the second combined current, and an output to provide a second track-and-hold output signal;

a second amplifier coupled to receive the second track-and-hold output signal, and an output to provide a second amplified output signal; and a second analog-to-digital converter (ADC) coupled to receive the second amplified output signal, and an output coupled to provide a digital representation of the second amplified output signal.

10. The NFC receiver of claim 9, wherein the first and second mixers each provide a subtraction operation, and wherein the first current and the second current are provided at a current level to at least partially suppress the carrier portion.

11. The NFC receiver of claim 9, wherein the input of each of the first and second track-and-hold circuits includes a positive input and a negative input, and wherein each of the first and second mixer circuits further comprises:
   a first switch having a first terminal coupled to the first input terminal and a second terminal coupled to the positive input;
   a second switch having a first terminal coupled to the first input terminal and a second terminal coupled to the negative input;
   a third switch having a first terminal coupled to the second input terminal and a second terminal coupled to the positive input; and
   a fourth switch having first terminal coupled to the second input terminal and a second terminal coupled to the negative input.

12. The NFC receiver of claim 9, wherein the first and second channels are first and second quadrature channels.

13. The NFC receiver of claim 9, further comprising:
   a first averaging circuit coupled between the output of the first track-and-hold circuit and the first amplifier, the first averaging circuit having an input coupled to receive the first series of track-and-hold output samples, and an output for providing an output signal that is an average of two consecutive output samples of the first series of track-and-hold output samples; and
   a second averaging circuit coupled between the output of the second track-and-hold circuit and the second amplifier, the second averaging circuit having an input coupled to receive the second series of track-and-hold output samples, and an output for providing an output signal that is an average of two consecutive output samples of the second series of track-and-hold output samples.

14. The NFC receiver of claim 9, further comprising a switch coupled between the first and second input terminals, the switch being controlled to provide a relatively constant input impedance for the NFC receiver.

15. The NFC receiver of claim 9, wherein a gain of the first and second amplifiers is variable.

16. A near-field communication (RFC) receiver comprising:
   first and second input terminals for receiving first and second input signals, respectively, wherein the first and second input signals includes a modulated portion and a carrier portion;
   a first quadrature channel comprising:
   a first digital-to-analog converter (DAC) to provide a first current;
   a first mixer circuit having a first input coupled to receive the first and second input signals and a second input coupled to receive the first current, and in response, the first mixer circuit provides a first combined current, wherein the carrier portion of the first and second input signals is at least partially suppressed in the combined current;
   a first track-and-hold circuit having an input coupled to receive the first combined signal, and an output to provide a first series of track-and-hold output samples;
   a first averaging circuit having an input coupled to the output of the first track-and-hold circuit to receive the first series of track-and-hold output samples, and an output for providing an output signal that is an average of two consecutive output samples of the first series of track-and-hold output samples;
   a first amplifier coupled to receive the output signal from the first averaging circuit, and an output to provide a first amplified output signal; and
   a first analog-to-digital converter (ADC) coupled to receive the first amplified output signal, and an output to provide a digital representation of the first amplified output signal; and
   a second quadrature channel comprising:
   a second DAC to provide a second current;
   a second mixer circuit having a first input coupled to receive the first and second input signals, and a second input coupled to receive the second current, and in response, the second mixer circuit provides a second combined current, wherein the carrier portion of the first and second input signals is at least partially suppressed in the second combined current;
   a second track-and-hold circuit having an input coupled to receive the second combined current, and an output to provide a second series of track-and-hold output samples;
   a second averaging circuit having an input coupled to the output of the second track-and-hold circuit to receive the second series of track-and-hold output samples, and an output to provide an output signal that is an average of two consecutive output samples of the second series of track-and-hold output samples;
   a second amplifier coupled to receive the output signal from the second averaging circuit, and an output to provide a second amplified output signal; and
   a second analog-to-digital converter (ADC) coupled to receive the second amplified output signal, and an output coupled to provide a digital representation of the second amplified output signal.

17. The NFC receiver of claim 16, wherein the input of each of the first and second track-and-hold circuits includes a positive input and a negative input, and wherein each of the first and second mixer circuits further comprise:
   a first switch having a first terminal coupled to the first input terminal and a second terminal coupled to the positive input;
   a second switch having a first terminal coupled to the first input terminal and a second terminal coupled to the negative input;
   a third switch having a first terminal coupled to the second input terminal and a second terminal coupled to the positive input; and
   a fourth switch having first terminal coupled to the second input terminal and a second terminal coupled to the negative input.

18. The NFC receiver of claim 16, further comprising a first capacitor and a first resistor coupled together in series and to the first input terminal, and a second capacitor and a second resistor coupled together in series and to the second input terminal.

19. The NFC receiver of claim 16, wherein the first and second mixers each provide a current subtraction operation.

\* \* \* \* \*